United States Patent

Oleksiak

[15] 3,706,976

[45] Dec. 19, 1972

[54] THREE-DIMENSIONAL SELECTION TECHNIQUE FOR VARIABLE THRESHOLD INSULATED GATE FIELD EFFECT TRANSISTOR MEMORIES

[72] Inventor: Robert E. Oleksiak, Carlisle, Mass.

[73] Assignee: Sperry Rand Corporation

[22] Filed: Nov. 5, 1970

[21] Appl. No.: 87,140

[52] U.S. Cl. ..............................................340/173 R

[51] Int. Cl. ...........................G11c 11/40, G11c 5/06

[58] Field of Search ..................................340/173 R

[56] References Cited

OTHER PUBLICATIONS

Noyce, R. N., "MOSFET Semiconductor IC Memories" In Electronics World, October 1970, p. 46—48

*Primary Examiner*—Malcolm A. Morrison
*Assistant Examiner*—R. Stephen Dildine, Jr.
*Attorney*—S. C. Yeaton

[57] ABSTRACT

A memory array is made up of rows and columns of memory elements. Each memory element includes a known type of variable threshold insulated gate field effect transistor characterized by electrically controllable conduction thresholds established by potentials applied between the respective gate electrodes and the substrate on which the transistors are formed. A desired memory element is selected by first applying an enabling voltage to the drain electrodes of all transistors in a group of columns including the column containing the desired element. A second enabling voltage is then applied to the gate electrodes of all transistors in the row containing the desired memory element. A third voltage applied to the column containing the desired transistor and the corresponding columns in each group of columns selects the desired transistor.

9 Claims, 2 Drawing Figures

INVENTOR
ROBERT E. OLEKSIA
BY
ATTORNEY

INVENTOR
ROBERT E. OLEKSIAK
BY Joseph M Roehl
ATTORNEY

THREE-DIMENSIONAL SELECTION TECHNIQUE FOR VARIABLE THRESHOLD INSULATED GATE FIELD EFFECT TRANSISTOR MEMORIES

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The invention relates to computer memory circuits and more specifically to computer memory circuits employing variable threshold insulated gate field effect transistors as memory elements.

2. Description of the Prior Art

Copending U.S. Pat. applications Ser. No. 648,414 entitled, "Electrically Alterable Non-Destructive Readout Field Effect Transistor Memory, " and now U.S. Pat. No. 3,508,211 and Ser. No. 767,230 entitled, "Plural Dielectric Layered Electrically Alterable Non-Destructive Readout Memory Element", and now U.S. Pat. No. 3,590,337 filed in the name of Horst A. R. Wegener and assigned to the present assignee, relate to varieties of variable threshold transistors useful as memory elements. Each element is comprised of a variable threshold insulated gate field effect transistor whose conduction threshold is electrically alterable by impressing a binary voltage between the gate electrode and the substrate in excess of a predetermined finite magnitude. The polarity of the voltage determines the sense in which the threshold is varied. Upon the application to the gate electrode of a fixed interrogation voltage having a value intermediate to the binary valued conduction thresholds, the binary condition of the transistor can be sensed by monitoring the magnitude of the resulting source-drain current. The magnitude of the interrogation voltage is insufficient to change the pre-existing conduction threshold so that non-destructive readout is achieved. The value of the variable threshold transistor memory element lies partly in the fact that it is completely compatible with the use of integrated microelectronic circuit fabrication techniques and devices useful in digital computers.

Prior art memory arrays using such memory elements frequently require deep isolation diffusions between the memory array and selection circuits if the circuits are to be included on the same chip. If the circuits are formed on separate chips, a large number of interconnections between the chips are required.

SUMMARY OF THE INVENTION

A simplified memory array of the type employing the variable threshold transistor memory elements is provided in accordance with the principles of the present invention by arranging the memory elements in rows, columns and groups of columns. A desired memory element is selected by applying an enabling voltage to the same electrode of each of the transistors in the group containing the desired memory element. A second enabling voltage is applied to a second electrode of each of the transistors in a row containing the desired memory element. A third enabling voltage is applied to the third electrode of all transistors in the column containing the desired transistor and the corresponding column in each group of columns.

DESCRIPTION OF THE PREFERRED EMBODIMENT

In the description of the circuit operation that follows, reference is made to "positive" thresholds and "-negative" thresholds. These terms are meant to be correlative between the polarity of the "write" signal applied and the resultant threshold voltage. This does not means, for example, that a "positive" threshold is a threshold voltage of +2 V and a "negative" threshold is a threshold voltage of −5 V, but rather that the "positive" threshold was obtained by a write voltage of +50 V, and the negative voltage by a "write" voltage of −50 V. In the actual embodiment of the circuit, the "positive" threshold is about −2 V and the "negative" threshold is −12 V.

Figure 1:
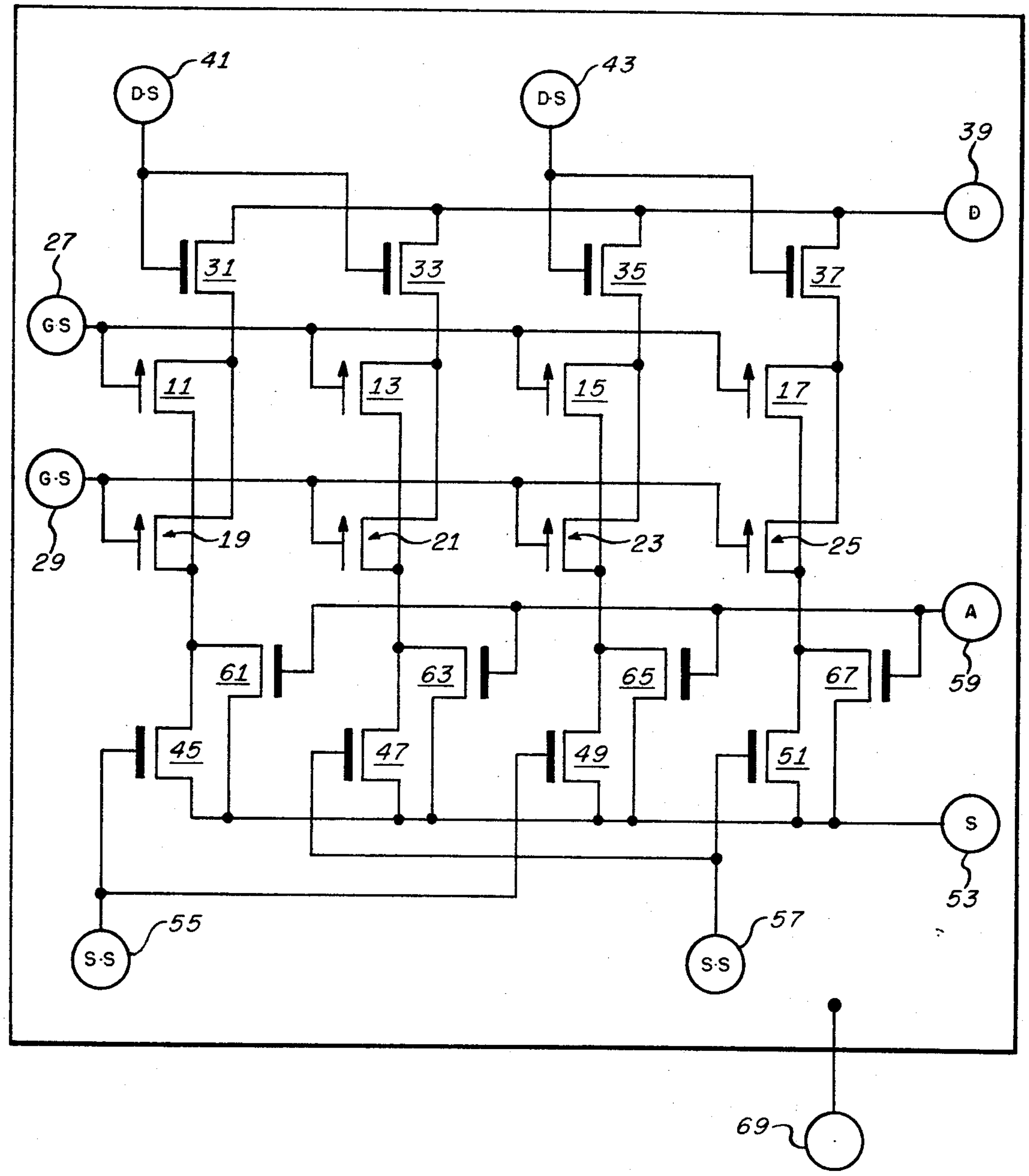
FIG. 1 is a schematic diagram illustrating a memory array employing the principles of the invention.

Referring now to FIG. 1, an eight word by 1-bit memory array contains eight variable threshold insulated gate field effect transistors formed on a common substrate. Preferably, these transistors are P-channel enchancement mode devices. They are arranged in a first row containing the transistors 11, 13, 15 and 17; and a second row containing the transistors 19, 21, 23 and 25. The gate electrodes of the transistors in the first row are energized from a gate select terminal 27 and the gate electrodes of the transistors in the second row are energized from a gate select terminal 29.

The drain electrodes of the variable threshold transistors are energized through conventional insulated gate field effect drain transistors 31, 33, 35 and 37 by means of a voltage applied to the drain terminal 39.

The aforementioned drain transistors 31 and 33 respond to voltages applied to their gate electrodes from a drain select terminal 41, whereas the drain transistors 35 and 37 respond to voltages applied to their gate electrodes from a drain select terminal 43.

It will be noticed that any given drain transistor applies drain voltages to each variable threshold transistor in a corresponding column. Thus the drain transistor 31 applies voltages to the drain electrodes of the variable threshold transistors 11 and 19 in the first column and the drain transistor 33 applies drain voltages to the drain electrodes of the variable threshold transistors 13 and 21 in the second column. It will also be noticed that the drain transistors 31 and 33 associated with the first and second columns are both actuated in response to voltages applied to the drain select terminal 41. The first and second columns thus constitute a first group of columns. Similarly, the drain transistors 35 and 37 are both actuated in response to voltages applied to the drain select terminal 43. The corresponding third and fourth columns therefore may be considered to constitute a second group of columns.

The source electrodes of the variable threshold transistors are actuated in response to signals from conventional fixed threshold source transistors 45, 47, 49 and 51. These source transistors apply voltages to the source electrodes of the variable threshold transistors from the source terminal 53. The source transistors 45 and 49 in the first and third columns are actuated in response to voltages applied to a source select terminal 55. The source transistors 47 and 51 in the second and fourth columns are actuated in response to voltages applied to a source select terminal 57.

Voltage may also be applied to the source electrodes of all of the variable threshold transistors from an auxiliary terminal 59 through the auxiliary WRITE transistors 61, 63, 65 and 67.

The source transistors are constructed to have a transconductance at least equal to 10 times that of the drain transistors. The auxiliary WRITE transistors have a transconductance less than one-tenth the transconductance of the drain transistors.

Because of the relatively high transconductance of the source transistors with respect to that of the drain transistors, if a drain and source transistor associated with a given variable threshold transistor are both conducting, the channel of the variable threshold transistor will be at the source voltage applied to source terminal 53.

If the drain and source transistors associated with a given variable threshold transistor are both non-conducting, the channel of the variable threshold transistor will be at the voltage of the auxiliary terminal 69.

The source, drain and auxiliary WRITE transistors are of a type that is rendered conductive by applying a negative gate voltage thereto and rendered non-conductive by applying a zero gate voltage thereto.

It will be noticed that voltages applied to the drain select terminals 41 and 43 enable the corresponding group of columns. Voltages applied to the source select terminal 55 provide an enabling voltage for the first column in the first group and the corresponding first column in the second group. Voltages applied to the source select terminal 57 constitute and enabling voltage for transistors in the second column of each group.

Enabling voltages are also applied to the upper row of variable threshold transistors through the gate select terminal 27 and to the lower row of variable threshold transistors through the gate select terminal 29.

Substrate voltages are applied to a substrate terminal 69.

A variable threshold transistor that has been set to a positive threshold provides a conduction path between its source and drain electrodes in response to an interrogation voltage applied to the gate electrodes of the transistor whereas a variable threshold transistor that has been set to a negative threshold provides a non-conductive path between its source and drain electrodes. Thus the existence or absence of a conductive source-drain path can be used to determine the threshold setting of a memory element.

In operation, the substrate is normally maintained at ground potential.

The memory is first cleared by applying +50 volt potentials to the terminals 27 and 29 so as to set all of the variable threshold transistors to the positive threshold. Information is then written into the memory by setting appropriate variable threshold transistors to the negative threshold.

During the WRITE mode of operation, the terminals 53 and 59 are driven to a potential of −40 volts.

Assume that the variable threshold transistor 11 is to be set to the negative threshold. A −50 volt potential would then be applied to the terminals 41, 27 and 57. The terminals 39, 43, 55 and 29 would be grounded. The drain electrodes of the variable threshold transistors 11 and 19 would be at ground potential under these conditions. Since the terminal 55 is at ground potential, the −40 volt potential applied to terminal 53 cannot reach the source electrodes of the transistors 11 and 19. When the −50 volt potential is applied to the gate electrodes of the transistor 11, therefore, this memory element is set to its negative threshold. Since the terminal 29 is at ground potential, the positive threshold setting of the transistor 19 is undisturbed under these conditions.

Since the terminal 57 was driven negative under the assumed conditions, the associated source transistors 47 and 51 will be rendered conductive.

It will be remembered that the transconductance of the source transistors is at least 10 times greater than the corresponding transconductance of the drain transistors. Because of this relationship, the channels of the variable threshold transistors 13 and 17 will be at the −40 volt level of the terminal 53 and the −50 volt potential applied to the terminal 27 will not disturb the previously set positive threshold of this variable threshold transistor.

The drain electrode of the variable threshold transistor 15 is isolated from the voltage on terminal 39 since the drain transistor 35 is cutoff by the ground potential applied to the terminal 43. The source electrode of the transistor 15 is isolated from the voltage at the terminal 53 because the source transistor 49 is cut off by the voltage applied to the terminal 55. However, the source electrode is coupled to the auxiliary terminal 59 through the low transconductance auxiliary WRITE transistor 65. The source electrode thus assumes a potential of −40 volts under the previously described conditions. The −50 volt potential applied to the terminal 27 is insufficient to disturb the previously set positive threshold on the transistor 15.

Since the voltage applied to the terminal 29 remains at zero potential under the assumed conditions, none of the memory elements in the lower row are affected by the foregoing conditions.

Information can be written into each of the other variable threshold transistors serially. If a variable threshold transistor is to be maintained in the positive threshold condition, the drain terminal 39 is driven to a potential of −40 volts during the appropriate write-in time. Thus if the positive threshold condition of the variable threshold transistor 11 were to be maintained under the previously described conditions, the −40 volt potential applied to the drain terminal 39 would provide a −40 volt potential on the channel on the variable threshold transistor 11 and the −50 volt potential applied to the terminal 27 would permit retention of the positive threshold.

Readout in an array such as that of FIG. 1 is conducted in serial fashion. The value of a bit of information stored in a given variable threshold transistor is determined by applying an interrogating voltage to the gate electrode of that transistor and determining if there is a resultant current flow between the drain and source terminals 39 and 53.

For example, if information is to be read out of the variable threshold transistor 11, the terminals 29, 43, 57 and 59 would be grounded and the terminals 41, 53 and 55 would be set to a negative value so as to permit current flow only through the column containing the transistor 11. An interrogating pulse would be applied to the gate terminal 27. The interrogating pulse consists of a negative pulse having an amplitude less than that of the voltage used to set the conduction thresholds. If the variable threshold transistor 11 remained at a positive threshold, a resultant current flow could be detected at the terminal 39. If the transistor 11 had been set to a negative threshold, this transistor would not conduct and no indication of current flow would appear at the terminal 39.

In summary, the various modes of operation are carried out as follows:

CLEAR

The variable threshold transistors are all set to a positive conduction threshold by applying a +50 volt potential to all of the gate select terminals while holding the substrate at ground potential. This applies to a +50 volt potential across the gate insulators of all transistors.

WRITE

If the selected transistor is to be set to a negative threshold, the drain electrode of the selected transistor is grounded by driving the drain transistors in the associated group into conduction and grounding the drain terminal. The source transistor in the associated column is driven to cutoff since the conducting source transistors perform an inhibiting function in this mode. A −50 volt potential is applied to the gate select terminal in the associated row. This applies a negative voltage across the gate insulator of the selected transistor and sets it to the negative threshold. The remaining variable threshold transistors are undisturbed at this time.

If the selected transistor is to remain in its positive conduction threshold condition, a −40 volt potential is applied to the drain terminal 39. This drives the drain electrode of the selected variable threshold transistor to −40 volts and only a −10 volt potential appears across the gate insulator of the selected transistor. This low potential is insufficient to disturb the original threshold setting of the selected transistor.

READ

During the READ mode of operation, readout current may be monitored at the drain terminal 39. All of the remaining terminals with the exception of the associated drain select, source, source select and gate select terminals are grounded. The associated drain select, source select and gate select terminals are driven negative so as to complete a conducting source-drain path through the selected transistor if it remains in the positive threshold condition. If this transistor has been switched to the negative threshold condition, there is no source-drain conductive path and, therefore, no current flow is indicated.

The memory circuit may be expanded by increasing the number of columns, rows and groups in the array. Because the various terminals are connected to pluralities of semiconductor devices, only a comparatively small number of interconnections is required. A 64 word by 4-bit (256-bit total) memory would require four drain terminals. However, such a memory would require only double the number of source-drain and gate select terminals. Such an expanded memory would still require only single source-auxiliary and substrate terminals.

It will be remembered that during the WRITE mode, the variable threshold transistor that is enabled from the same source select terminal and occupies the same row as the selected variable threshold transistor, depends upon a source voltage applied from the auxiliary terminal 59 to retain its cleared state. Specifically, under the conditions assumed previously, when information was being written into the variable threshold transistor 11, the variable threshold transistor 15 was isolated from the drain and source terminals 39 and 53 because the drain and source transistors 35 and 49 were cut off. The auxiliary WRITE transistor 65, however, held the source electrode of the transistor 15 at the −40 volt potential of the auxiliary terminal so that only 10 volts appeared across the gate insulator of the transistor 15 and the previously-set positive threshold was undisturbed.

In some instances, it may be desired to eliminate the auxiliary terminal and the auxiliary WRITE transistors. This may be done by applying a negative low-duty-cycle pulse train to the appropriate source select terminal. This will permit a charge to accumulate on the gate insulator of the non-selected transistor (e.g. transistor 15) which will maintain a −40 volt channel potential so as to prevent information being written into that transistor at that time.

Figure 2:
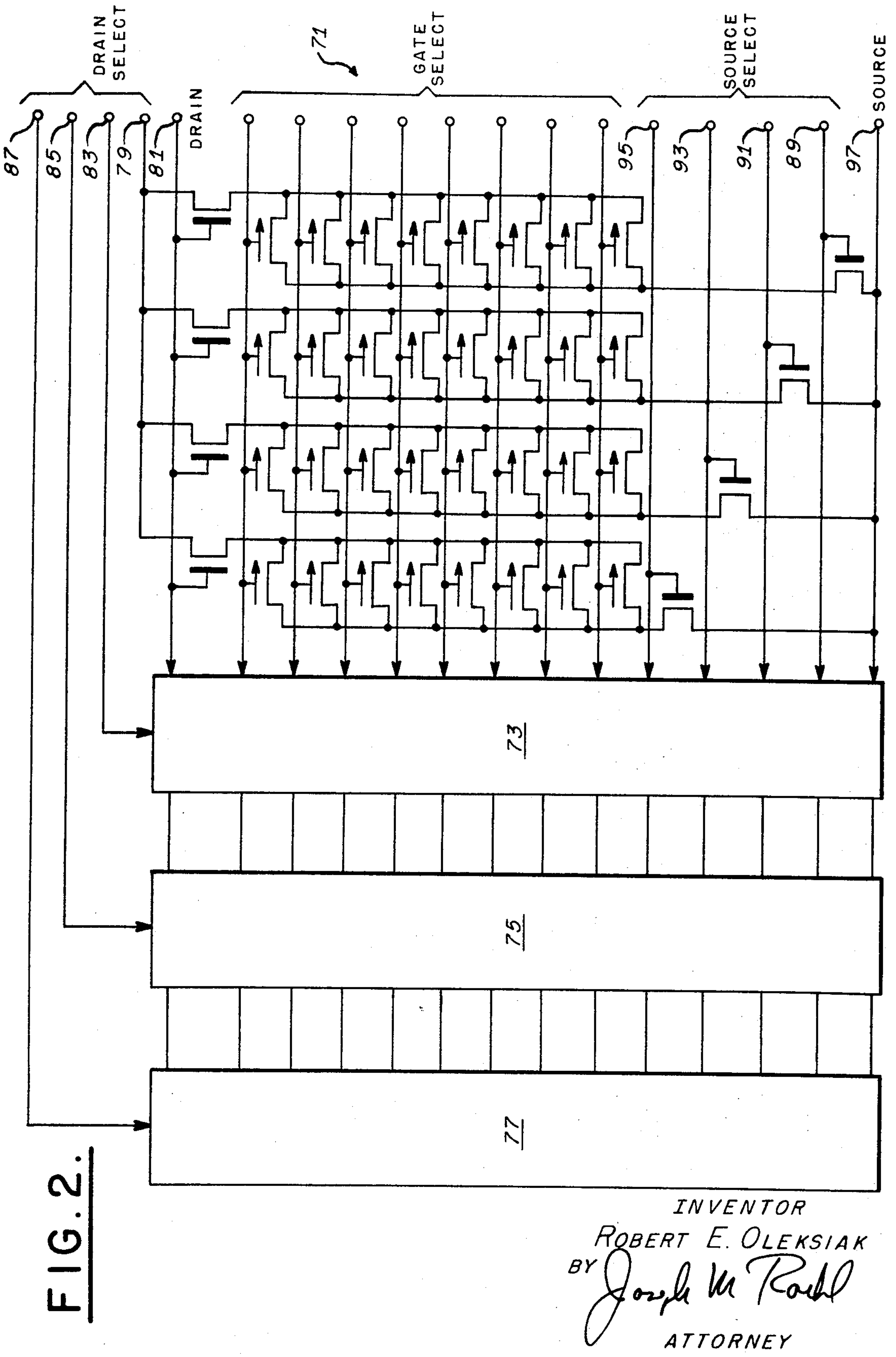
FIG. 2 is a schematic diagram illustrating a representative section of a larger memory array employing the principles of the present invention.

FIG. 2 depicts a 32 word by 1-bit memory 71 utilizing the principles of the invention and illustrates how four such circuits may be fabricated on a single chip to form a 128-bit memory. The three additional circuits 73, 75 and 77 are shown only in block form in FIG. 2 since they are identical to the circuit 71. Each of these four circuits may be considered as a group of columns. In the memory circuit of FIG. 2, all connections except the drain terminal 79 are common to the four identical circuits.

FIG. 2 also represents a slight variation from the circuit of FIG. 1 in that it illustrates how the gate electrodes of the drain transistors of all groups may be energized from the same terminal 81, whereas the drain electrodes of each group of drain transistors may be energized from separate drain select terminals 79, 83 85 and 87. The voltages applied to these drain select terminals determine the group of columns to be enabled. The particular column in each group hat is to be enabled is determined by the source transistors associated with the various columns and the voltages applied to the source select terminals 89, 91, 93 and 95. A negative voltage applied to the source select terminal 95, for instance, would apply the voltage on the source terminal 97 to the source electrodes of all the variable threshold transistors in the first column of each of the groups 71, 73, 75 and 77.

Similarly, each gate select terminal is connected to all of the gate electrodes of the variable threshold transistors in the corresponding row in each of the groups.

It will be appreciated that although P-channel enhancement mode variable threshold transistors have been specified, N-channel or depletion mode devices might be used if desired by making the necessary adjustments in voltage polarity.

In the memory arrays described heretofore, a common drain signal was used as the criterion for determining the various groups whereas a common source signal was used as the criterion for determining the corresponding columns in all groups. Since the drain and source electrodes on any variable threshold transistor effectively constitute a pair of output terminals, it will be obvious that a memory circuit could be formed in which the groups are determined by a common source configuration and the corresponding columns could be determined by a common drain configuration if desired.

While the invention has been described in its preferred embodiment, it is to be understood that the words which have been used are words of description rather than limitation and that changes may be made within the purview of the appended claims without departing from the true scope and spirit of the invention in its broader aspects.

I CLAIM:

1. A memory circuit containing an array of variable threshold transistors, each of said transistors having a gate electrode and a pair of output electrodes, said variable threshold transistors being arranged in rows, columns and groups of columns, means to apply a first voltage to the gate electrodes of all variable threshold transistors in any given row, means to apply a second voltage to the corresponding output electrodes on all variable threshold transistors in any group of variable threshold transistors, and means to apply a third voltage to the remaining corresponding output electrodes of all variable threshold transistors in the corresponding column of each group of columns.

2. The memory circuit of claim 1 wherein the pair of output electrodes on each variable threshold transistor includes a source electrode and a drain electrode, wherein the means to apply said second voltage includes means to apply that voltage to the drain electrodes of the respective variable threshold transistors, and wherein the means to apply said third voltage includes means to apply that voltage to the source electrodes of the respective variable threshold transistors.

3. The memory circuit of claim 2 wherein the means to apply said second voltage includes a drain terminal and individual drain transistors corresponding to each column of variable threshold transistors for selectively connecting said drain terminal to the drain electrodes of all of the variable threshold transistors in the associated column.

4. The memory circuit of claim 3 wherein the drain transistors are fixed threshold insulated gate field effect transistor having source, drain and gate electrodes, said memory circuit further including a drain select terminal corresponding to teach of said groups of memory columns, each of said drain transistors having one of its source and drain electrodes connected to the drain electrode of each of the variable threshold transistors in the corresponding column and the other of its source and drain electrodes connected to said drain terminal, each of said drain transistors further having its gate electrode connected to the drain select terminal corresponding to the group in which the associated variable threshold transistors are classified.

5. The memory circuit of claim 4 wherein the means to apply said third voltage includes a source terminal and individual source transistors corresponding to each column of variable threshold transistors for selectively connecting said source terminal to the source electrodes of all of the variable threshold transistors in the associated column.

6. The memory circuit of claim 5 wherein the source transistors are fixed threshold insulated gate field effect transistors having source, drain and gate electrodes, said memory circuit further including a source select terminal corresponding to each of the columns in any group of memory columns, each of said source transistors having one of its source and drain electrodes connected to the source electrode of each of the variable threshold transistors in the associated column and the other of its source and drain electrodes connected to said source terminal, each of said source transistors further having its gate electrode connected to the source select terminal associated with the column with which that source transistor is associated.

7. The memory circuit of claim 6 wherein said source transistors have a transconductance at least 10 times that of said drain transistors.

8. The memory circuit of claim 7 further including an auxiliary input terminal and individual auxiliary WRITE transistors coupled to each memory column, said auxiliary WRITE transistors having source, drain and gate electrodes, said source and drain electrodes being connected to the corresponding electrodes of the source transistor associated with the same column, the gate electrodes of all auxiliary WRITE transistors being connected to said auxiliary terminal.

9. The memory circuit of claim 8 wherein the source transistors have a transconductance at least 10 times as great as the transconductance of the auxiliary WRITE transistors.

* * * * *